Dec. 27, 1938.   W. F. PIOCH   2,141,222
FASTENER
Filed Oct. 6, 1938

WITNESS
E. Nitzke

INVENTOR
William F. Pioch
BY Edwin C. McRae
E. L. Davis
ATTORNEYS.

Patented Dec. 27, 1938

2,141,222

UNITED STATES PATENT OFFICE 2,141,222

FASTENER

William F. Pioch, Detroit, Mich., assignor to Ford Motor Company, Dearborn, Mich., a corporation of Delaware Application October 6, 1938, Serial No. 233,627

3 Claims. (Cl. 24—255)

The object of my invention is to provide a fastener especially adapted for fastening hydraulic tubing to automobile frame and chassis members. This tubing comprises conventional ¼" diameter steel tubing which is used in connection with hydraulic brakes, the tubing extending from a master cylinder at the center of the car along the vehicle frame and torque tube to positions adjacent to the respective wheels of the car. It is highly desirable that such tubing may be quickly assembled on the chassis and that when the tubing is once assembled it will be permanently fastened in place. The use of screws and bolts and the like for such fastening is unsatisfactory because of the danger of these becoming loose in which case the tube might readily be pulled out of position and broken by contact with projections on the road. The object of my invention is, therefore, to provide a fastening device which does not depend upon screws nor the like for securing the tube in position, and by means of which the tubes may be quickly and permanently installed when the car is being assembled.

With these and other objects in view my invention consists in the arrangement, construction and combination of the two parts which comprise my improved fastener, as described in the specification, claimed in my claims, and illustrated in the accompanying drawing, in which:

Figure 1:
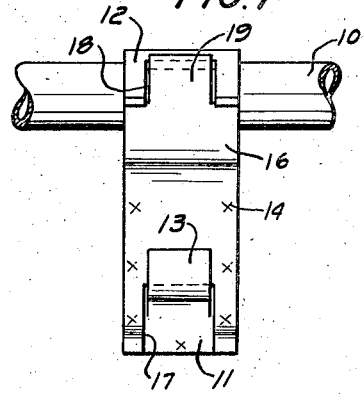
Figure 1 is a double sized plan view of my improved clip, showing the tube fastened in position.

Referring to the accompanying drawing, I have used the reference numeral 10 to indicate the tube which it is desired to fasten in place. This tube is approximately ¼" in diameter and may be either of the seamless type or rolled, as desired. My improved fastening clip comprises an elongated base member 11, one end of which is bent back upon itself as at 12 to form a hook or pocket into which the tube may be radially inserted. The end of the hook 12 is notched at 18, for a purpose later to be described. The other end of the base is provided with a tongue 13 which is formed from the material of the base and which extends towards the pocket 12. The tongue 13 is spaced just slightly above the base 11.

Figure 2:
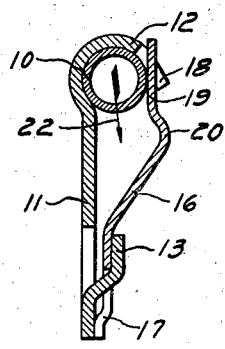
Figure 2 is a vertical central sectional view through the fastener shown in Figure 1.

The base 11 is adapted to be spot welded, as shown by crosses 14 in Figure 2, to the member to which the tube is to be secured. In the illustration the base is spot welded to a radius rod 15, but it may be fastened to the frame of the car or any other member, in like manner. After the base is welded in place, the tube is inserted into the pocket 12 and a resilient retaining clip 16 is snapped into position.

The retaining clip 16 is formed from flat spring steel strips having a width the same as that of the base 11. One end of the clip 16 is provided with a notch 17 of a width sufficient that the clip may straddle the tongue 13. The other end of the clip 16 is provided with an ear 19 which fits into the notch 18, while the intermediate portion of the clip is humped at 20 so that the clip may be pushed into position.

Figure 6:
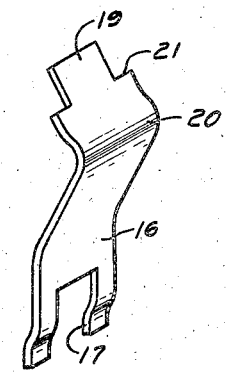
Figure 6 is a perspective view of the spring fastener, showing its free contour.

After the tube 10 is assembled into the pocket 12, the retaining clip 16 is pushed into position with the notch 17 straddling the tongue 13, as shown in Figure 2. The clip, being formed as shown in Figure 6, will resist this movement but when enough pressure is applied to the hump 20, the clip will move to position where the ear 19 snaps down into the notch 18. Shoulders 21 on the clip are prevented by the end of the base from permitting longitudinal movement of the clip. The only way that the clip can be removed is to first spring the ear 19 out beyond the bent-over portion 12 and then, while in this position, moving the clip lengthwise. This can only be done with the use of a screw driver or some other tool and cannot in any case be done by objects striking the clip.

It will be noted from Figure 2 that the tube is urged into the pocket by the ear 19 and that as the pocket 12 is slightly recessed into the base 11, movement of the tube in any direction is resiliently resisted. If, however, sufficient pressure is exerted longitudinally in the direction shown by arrow 22, the clip will be forced outwardly beyond the end of the bent portion 12 so that it might become loosened.

Figure 3:
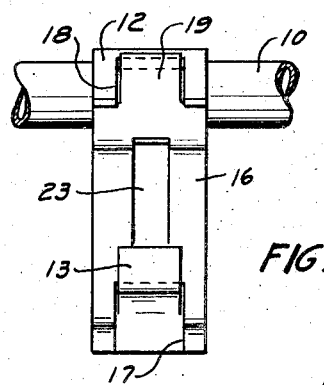
Figure 3 is a plan view similar to Figure 1, showing an alternate construction.
Figure 4:
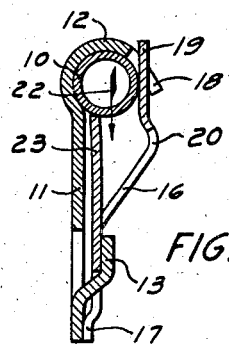
Figure 4 is a vertical central sectional view taken through the clip shown in Figure 3.
Figure 5:
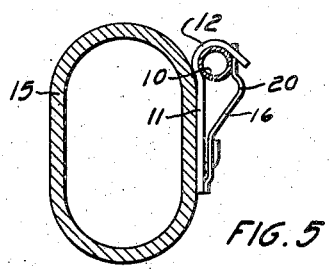
Figure 5 is a full sized view of my improved clip installed on one of the radius rods associated with a motor vehicle.

In order to prevent the occurrence of even this remote happening, I have shown an alternate construction in Figures 3 and 4 in which means are provided for positively preventing the above described movement of the tube. In this construction the base 11 is the same as that previously described. However, the clip differs from the previously described clip in that a tongue 23 is pressed from metal of the clip, which tongue extends towards the pocket 12. When the clip is assembled into position the tongue 23 is located in line with the diameter of the tube 10 and, being part of the retained end of the clip, does not spring outwardly even though the ear 19 of the clip is moved outwardly. When this type of clip is used the tube is normally held by the ear 19, but should a pressure be exerted upon the tube 10 in the direction of the arrow 22, the tongue 23 will positively prevent movement of the tube in the only direction permitted by the pocket 12. Thus, it is impossible to dislodge the clip from the base. The ear 19 resiliently urges the tube 10 to its retained position and thus prevents rattling between the parts.

Among the advantages obtained it may be well to mention that both the base member and the retaining clip are formed as relatively inexpensive sheet metal stampings, requiring no tapped holes or other expensive machine operations. Still further, the device is so constructed that it may be readily secured to any one of the various parts of the car and after the part has been assembled on the car frame, the tubes may be speedily dropped into the pockets and the retaining clip snapped into position much faster than it would be possible to secure screws or other devices in place.

Still further, the elimination of screws or other detachable fastening means which might shake loose is eliminated, thereby positively preventing the accidental dislocation of the tube from the retaining clip.

Some changes may be made in the arrangement, construction and combination of the two parts comprising my improved fastening device without departing from the spirit of my invention and it is my intention to cover by my claims such changes as may be reasonably included within the scope thereof.

I claim as my invention:

1. A fastener device especially adapted to hold a tube in position comprising, a relatively flat sheet metal base, one end of which is bent around to form a pocket into which the tube may be radially inserted, the opposite end of said base having a tongue extending toward said pocket in position spaced from said base, and a retaining clip formed of resilient sheet metal, said clip having one end notched so that it may straddle said tongue with the adjacent portion of the clip disposed beneath said tongue and having means projecting from the other end which coact with said base so that when the notched end of the clip is inserted under said tongue, said means will urge said tube into said pocket and resiliently retain said tube therein.

2. A fastening device especially adapted to hold a tube in position comprising, a relatively flat sheet metal base, one end of which is bent to form a pocket into which a tube may be radially inserted, said bent portion having a notch formed in its outer end, the opposite end of said base having a tongue thereon extending toward said pocket in position spaced from said base, and a retaining clip formed of resilient sheet metal, said clip having one end notched so that it may straddle said tongue with the adjacent portion of the clip disposed beneath said tongue and having an ear projecting from the other end, said clip being preshaped so that when its notched end is inserted under said tongue, said ear will be urged into the notched end of said base and resiliently retain said tube in said pocket.

3. A fastening device especially adapted to hold a tube in position comprising, a relatively flat rigid sheet metal base one end of which is bent to form a pocket into which a tube may be radially inserted, the opposite end of said base having a tongue extending towards said pocket in position spaced from said base, and a retaining clip formed of resilient sheet metal, said clip having one end notched so that it may straddle said tongue with the adjacent portion of the clip disposed beneath said tongue and having an ear projecting from its other end, said clip being preshaped so that when its notched end is inserted beneath said tongue, said clip will coact with the bent-up portion of said base and prevent the withdrawal of said clip from beneath said ear, the intermediate portion of said clip having a tongue formed from the metal thereof which extends from said notched end of the clip to the periphery of said tube so as to prevent the removal of said tube from said pocket independently of said ear.

WILLIAM F. PIOCH.